US010834045B2

United States Patent
Mahalank et al.

(10) Patent No.: US 10,834,045 B2
(45) Date of Patent: Nov. 10, 2020

(54) METHODS, SYSTEMS, AND COMPUTER READABLE MEDIA FOR CONDUCTING A TIME DISTANCE SECURITY COUNTERMEASURE FOR OUTBOUND ROAMING SUBSCRIBERS USING DIAMETER EDGE AGENT

(71) Applicant: Oracle International Corporation, Redwood Shores, CA (US)

(72) Inventors: Shashikiran Bhalachandra Mahalank, Bangalore (IN); Sridhar Karuturi, Raleigh, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/100,172

(22) Filed: Aug. 9, 2018

(65) Prior Publication Data

US 2020/0053044 A1 Feb. 13, 2020

(51) Int. Cl.
*H04L 29/12* (2006.01)
*H04L 29/06* (2006.01)
(Continued)

(52) U.S. Cl.
CPC ...... *H04L 61/1588* (2013.01); *H04L 63/0876* (2013.01); *H04W 8/04* (2013.01); *H04W 8/12* (2013.01); *H04L 2463/121* (2013.01)

(58) Field of Classification Search
CPC ............. H04L 61/1588; H04L 63/0876; H04L 2463/121; H04W 8/04; H04W 8/12
(Continued)

(56) References Cited

U.S. PATENT DOCUMENTS 6,091,958 A 7/2000 Bergkvist et al.
6,292,666 B1 * 9/2001 Siddiqui ............ H04B 7/18547
455/12.1
(Continued)

FOREIGN PATENT DOCUMENTS

CN 101917698 A 12/2010
CN 107 800 664 A 3/2018
(Continued)

OTHER PUBLICATIONS

Notice of Allowance and Fee(s) Due for U.S. Appl. No. 16/035,008 (dated Jan. 18, 2019).
(Continued)

*Primary Examiner* — Charles N Appiah
*Assistant Examiner* — Nicole M Louis-Fils
(74) *Attorney, Agent, or Firm* — Jenkins, Wilson, Taylor & Hunt, P.A.

(57) ABSTRACT

A method includes receiving an ingress Diameter message related to a mobile subscriber from a MME located in a non-home network, sending a RIR message containing a mobile subscriber identifier to a HSS in a home network of the mobile subscriber, receiving identification information identifying a MME in the home network that conducted a most recent attachment of the mobile subscriber, utilizing the identification information to send an IDR message containing the mobile subscriber identifier to the identified MME, receiving an IDA message containing attachment timestamp data corresponding to the most recent attachment of the mobile subscriber in the home network, determining a transit time using the UE attachment timestamp data and timestamp information corresponding to the ingress Diameter message, and analyzing the transit time to determine if the ingress Diameter message is to be designated as a suspicious ingress message.

14 Claims, 6 Drawing Sheets

(51) Int. Cl.
*H04W 8/04* (2009.01)
*H04W 8/12* (2009.01)

(58) Field of Classification Search
USPC .......................................................... 455/432
See application file for complete search history.

(56) References Cited

U.S. PATENT DOCUMENTS

| | | | |
|---|---|---|---|
| 6,308,075 | B1 | 10/2001 | Irten et al. |
| 7,043,754 | B2 | 5/2006 | Arnouse |
| 8,045,956 | B2 | 10/2011 | Sun et al. |
| 8,615,217 | B2 | 12/2013 | Ravishankar et al. |
| 8,879,431 | B2 | 11/2014 | Ridel et al. |
| 9,060,263 | B1 | 6/2015 | Carames et al. |
| 9,191,803 | B2 | 11/2015 | Patel et al. |
| 9,240,946 | B2 | 1/2016 | Cai et al. |
| 9,374,840 | B2 | 6/2016 | Monedero Recuero |
| 9,538,335 | B1 | 1/2017 | Bank et al. |
| 9,628,994 | B1 | 4/2017 | Gunyel et al. |
| 10,021,738 | B1 | 7/2018 | Mehta et al. |
| 10,212,538 | B2 | 2/2019 | Russell |
| 10,237,721 | B2 | 3/2019 | Gupta et al. |
| 10,306,459 | B1 | 5/2019 | Patil et al. |
| 10,470,154 | B2 | 11/2019 | Chellamani et al. |
| 10,616,200 | B2 | 4/2020 | Kumar et al. |
| 2001/0046856 | A1 | 11/2001 | McCann |
| 2002/0098856 | A1 | 7/2002 | Berg et al. |
| 2002/0181448 | A1 | 12/2002 | Uskela et al. |
| 2002/0193127 | A1 | 12/2002 | Martschitsch |
| 2003/0087647 | A1 | 5/2003 | Hurst |
| 2004/0140908 | A1 | 7/2004 | Gladwin et al. |
| 2005/0182968 | A1 | 8/2005 | Izatt et al. |
| 2005/0232236 | A1 | 10/2005 | Allison et al. |
| 2006/0068762 | A1 | 3/2006 | Baldwin et al. |
| 2006/0193258 | A1 | 8/2006 | Ballai |
| 2006/0211406 | A1 | 9/2006 | Szucs et al. |
| 2006/0242414 | A1 | 10/2006 | Corson et al. |
| 2007/0011261 | A1 | 1/2007 | Madams et al. |
| 2007/0174082 | A1 | 7/2007 | Singh |
| 2007/0281718 | A1 | 12/2007 | Nooren |
| 2008/0004047 | A1 | 1/2008 | Hill et al. |
| 2008/0026778 | A1 | 1/2008 | Cai et al. |
| 2008/0045246 | A1 | 2/2008 | Murtagh et al. |
| 2008/0125116 | A1 | 5/2008 | Jiang |
| 2008/0207181 | A1 | 8/2008 | Jiang |
| 2008/0222038 | A1 | 9/2008 | Eden |
| 2009/0045251 | A1 | 2/2009 | Jaiswal et al. |
| 2009/0195349 | A1 | 8/2009 | Frader-Thompson et al. |
| 2010/0062789 | A1 | 3/2010 | Agarwal et al. |
| 2010/0100958 | A1 | 4/2010 | Jeremiah |
| 2010/0105355 | A1 | 4/2010 | Nooren |
| 2010/0130227 | A1* | 5/2010 | Farthofer ................. H04W 8/10 455/456.1 |
| 2010/0161817 | A1 | 6/2010 | Xiao et al. |
| 2010/0223222 | A1 | 9/2010 | Zhou et al. |
| 2010/0235911 | A1 | 9/2010 | Nooren |
| 2010/0240361 | A1 | 9/2010 | Jiang |
| 2010/0313024 | A1* | 12/2010 | Weniger .............. H04L 63/0823 713/170 |
| 2011/0014939 | A1* | 1/2011 | Ravishankar ......... H04W 48/04 455/515 |
| 2011/0029655 | A1 | 2/2011 | Forbes, Jr. et al. |
| 2011/0063126 | A1 | 3/2011 | Kennedy et al. |
| 2011/0124317 | A1 | 5/2011 | Joo |
| 2011/0173122 | A1 | 7/2011 | Singhal |
| 2011/0191835 | A1 | 8/2011 | Hawkes et al. |
| 2011/0217979 | A1 | 9/2011 | Nas |
| 2011/0225091 | A1 | 9/2011 | Plastina et al. |
| 2011/0307381 | A1 | 12/2011 | Kim et al. |
| 2012/0099715 | A1 | 4/2012 | Ravishankar et al. |
| 2012/0131121 | A1 | 5/2012 | Snyder et al. |
| 2012/0203663 | A1 | 8/2012 | Sinclair et al. |
| 2012/0207015 | A1 | 8/2012 | Marsico |
| 2013/0171988 | A1* | 7/2013 | Yeung ................... H04W 8/12 455/432.1 |
| 2013/0331063 | A1 | 12/2013 | Cormier et al. |
| 2014/0199961 | A1 | 7/2014 | Mohammed et al. |
| 2014/0280645 | A1 | 9/2014 | Shuman et al. |
| 2014/0378129 | A1* | 12/2014 | Jiang ..................... H04W 60/04 455/432.1 |
| 2015/0012415 | A1 | 1/2015 | Livne et al. |
| 2015/0094060 | A1 | 4/2015 | Kouridakis et al. |
| 2015/0188979 | A1 | 7/2015 | Almeras et al. |
| 2016/0088461 | A1 | 3/2016 | Jiang |
| 2016/0156647 | A1 | 6/2016 | Engel et al. |
| 2016/0165432 | A1* | 6/2016 | Dubesset .............. H04W 76/12 455/433 |
| 2016/0269566 | A1 | 9/2016 | Gundamaraju et al. |
| 2016/0292687 | A1 | 10/2016 | Kruglick |
| 2017/0345006 | A1 | 11/2017 | Kohli |
| 2018/0020324 | A1 | 1/2018 | Beauford |
| 2018/0109953 | A1 | 4/2018 | He |
| 2018/0167906 | A1 | 6/2018 | Chellamani et al. |
| 2018/0205698 | A1 | 7/2018 | Gupta et al. |
| 2018/0310162 | A1 | 10/2018 | Kim et al. |
| 2019/0007788 | A1 | 1/2019 | Russell |
| 2019/0044932 | A1 | 2/2019 | Kumar et al. |
| 2020/0007538 | A1 | 1/2020 | Mehta |

FOREIGN PATENT DOCUMENTS

| | | |
|---|---|---|
| EP | 1 067 492 A2 | 1/2001 |
| EP | 1 906 682 A1 | 4/2008 |
| EP | 2 204 955 A1 | 7/2010 |
| EP | 3 493 569 A1 | 6/2019 |
| WO | WO 2005/091656 A1 | 9/2005 |
| WO | WO 2005/101872 A1 | 10/2005 |
| WO | WO 2007/084503 A2 | 7/2007 |
| WO | WO 2010/045646 A2 | 4/2010 |
| WO | WO 2010/105099 A2 | 9/2010 |
| WO | WO 2011/047382 A2 | 4/2011 |
| WO | WO 2019/005287 A1 | 1/2019 |
| WO | WO 2019/027813 A1 | 2/2019 |
| WO | WO 2020/013889 A1 | 1/2020 |

OTHER PUBLICATIONS

Advisory Action Before the Filing of an Appeal Brief and AFCP 2.0 Decision for U.S. Appl. No. 15/376,631 (dated Dec. 19, 2018).

Notice of Allowance and Fee(s) Due and Applicant-Initiated Interview Summary for U.S. Appl. No. 15/408,155 (dated Oct. 31, 2018).

Notification of Transmittal of the International Search Report and the Written Opinion of the International Searching Authority, or the Declaration for International Patent Application No. PCT/US2018/043985 (dated Oct. 9, 2018).

Final Office Action for U.S. Appl. No. 15/376,631 (dated Oct. 5, 2018).

Notice of Allowance and Fee(s) Due for U.S. Appl. No. 15/636,118 (dated Oct. 3, 2018).

Notification of Transmittal of the International Search Report and the Written Opinion of the International Searching Authority, or the Declaration for International Application No. PCT/US2018/030319 (dated Aug. 20, 2018).

Final Office Action for U.S. Appl. No. 15/405,155 (dated Jul. 26, 2018).

Commonly-assigned, co-pending U.S. Appl. No. 16/035,008 for "Methods, Systems, and Computer Readable Media for Validating a Visitor Location Register (VLR) Using a Signaling System No. 7 (SS7) Signal Transfer Point (STP)," (Unpublished, filed Jul. 13, 2018).

Commonly-assigned, co-pending U.S. Appl. No. 16/024,422 for "Methods, Systems, and Computer Readable Media for Network Node Validation," (Unpublished, filed Jun. 29, 2018).

Notice of Allowance and Fee(s) Due for U.S. Appl. No. 15/636,118 (dated Apr. 27, 2018).

Non-Final Office Action for U.S. Appl. No. 15/376,631 (dated Apr. 18, 2018).

Examiner's Answer for U.S. Appl. No. 13/047,287 (dated Feb. 26, 2018).

(56) References Cited

OTHER PUBLICATIONS

Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
Commonly-assigned, co-pending U.S. Appl. No. 15/666,300 for "Methods, Systems, and Computer Readable Media for Mobility Management Entity (MME) Authentication for Outbound Roaming Subscribers Using Diameter Edge Agent (DEA)," (Unpublished, filed Aug. 1, 2017).
Commonly-assigned, co-pending U.S. Appl. No. 15/636,118 for "Methods, Systems, and Computer Readable Media for Validating User Equipment (UE) Location," (Unpublished, filed Jun. 28, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42, (Jan. 2017).
"Edge Router (DEA)," http://www.mavenir.com/our-products/mobile-edge-router-dea, pp. 1-7 (Copyright 2017).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 13, 2012).
"Digital cellular telecommunications system (Phase 2+); Universal Monile Telecommunications System (UMTS); LTE; Location Services (LCS); Service description; Stage1 (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Non-Final Office Action for U.S. Appl. No. 13/047,287 (dated Jun. 6, 2012).
"3rd Generation Partnership Project; Technical Specification Group Services and System Aspects; Telecommunication management; Changing management; Diameter charging applications (Release 11)," 3GPP TS 32.299, V11.3.0, pp. 1-150 (Mar. 2012).
"Net-Net Diameter Director," http://www.oracle.com/us/industries/communications/net-net-diameter-director-ds-1985034.pdf, pp. 1-9 (Copyright 2012).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron CENTRON GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
"Draft LS on network verification of UE provided location," 3GPP TSG SA WG2 Meeting #81, pp. 1 (Oct. 11-15, 2010).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
Hakala et al., "Diameter Credit-Control Application," RFC 4006, pp. 1-115 (Aug. 2005).

(56) References Cited

OTHER PUBLICATIONS

Notification of Transmittal of the International Search Report and the Written Opinion of the International Searching Authority, or the Declaration for International Application Serial No. PCT/US2019.028814.
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
Final Office Action for U.S. Appl. No. 12/581,739 (dated Dec. 30, 2011).
Non-Final Office Action for U.S. Appl. No. 12/581,739 (dated Aug. 26, 2011).
Notification of Transmittal of the Internatioanl Search Report and the Written Opinion of the International Searching Authority, or the Declaration for International Application No. PCT/US2010/027043 (dated Oct. 19, 2010).
Notification of Transmittal of the International Search Report and the Writting Opinion of the International Searching Authoriyty, or the Declaration for International Applicatio No. PCT/US2009/061187 (dated May 17, 2010).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects;.Unstructured Supplementary Service Data (USSD)—Stage 1 (Release 8)," 3GPP TS 22.090, V8.0.0, pp. 1-10 (Dec. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Notification of Transmittal of the International Search Report and the Written Opinion of the International Searching Authority, or the Declaration for International Patent Application No. PCT/US2019/018990 (dated May 8, 2019).
Notice of Allowance and Fee(s) Due and Examiner-Initiated Interview Summary for U.S. Appl. No. 15/376,631 (dated Jul. 2, 2019).
Non-Final Office Action for U.S. Appl. No. 15/666,300 (dated Jun. 27, 2019).
Decision on Appeal for U.S. Appl. No. 13/047,287 (dated Jun. 18, 2017).
Commonly-assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).
Notification of Transmittal of the International Search Report and the Written Opinion of the International Searching Authority, or the Declaration for International Application Serial No.PCT/US2019/042203 (dated Nov. 11, 2019).
Applicant-Initiated Interview Summary for U.S. Appl. No. 15/666,300 (Oct. 29, 2019).
"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).

"Technical Specification Group Core Network and Terminals; Policy and Charging Control (PCC); Reference points (Release 16)," 3GPP TS 29.212, V16.1.0, pp. 1-285 (Sep. 2019).
"Technical Specification Group Core Network and Terminals; Mobile Application Part (MAP) specification (Release 15)," 3GPP TS 29.002, V15.5.0, pp. 1-1024 (Jun. 2019).
Commonly-assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).
Notice of Allowance and Fee(s) due for U.S. Appl. No. 12/581,739 (dated Aug. 8, 2012).
"FS.19 Diameter Interconnect Security," GSMA, pp. 1-3 (Dec. 20, 2019).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Notice of Allowance and Fee(s) Due and Examiner-Initiated Interview Summary for U.S. Appl. No. 15/666,300 (Feb. 13, 2020).
"Signalling Security in Telecom SS7/Diameter/5G," Enisa, pp. 1-30 (Mar. 2018).
"GSMA Guidelines for Diameter Firewall," NetNumber Inc., pp. 1-7 (Sep. 12, 2017).
Notification of Transmittal of the International Search Report and the Written Opinion of the International Searching Authority, or the Declaration for International Application No. PCT/US2020/024234 (dated Jul. 16, 2020).
Commonly-assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).
Non-Final Office Action for U.S. Appl. No. 16/024,422 (dated Jul. 8, 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).
Communication of European publication number and information on the application of Article 67(3) EPC for European Application Serial No. 18731923.1 (Apr. 8, 2020).
"3rd Generation Partnership Project; Technical Specification Group Services and System Aspects; Security architecture and procedures for 5G system (Release 16)," 3GPP TS 33.501, V16.2.0, pp. 1-227 (Mar. 2020).
"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).
"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).

* cited by examiner

METHODS, SYSTEMS, AND COMPUTER READABLE MEDIA FOR CONDUCTING A TIME DISTANCE SECURITY COUNTERMEASURE FOR OUTBOUND ROAMING SUBSCRIBERS USING DIAMETER EDGE AGENT

TECHNICAL FIELD

The subject matter described herein relates to fraud prevention in mobile communications networks. More particularly, the subject matter described herein relates to methods, systems, and computer readable media for conducting a time distance security countermeasure for outbound roaming subscribers using a Diameter edge agent (DEA).

BACKGROUND

Mobile communications networks are expanding and utilize multiple technologies and interconnects to carry signaling messages used to establish communications over the networks. Home network elements of a core network are typically not connected to foreign or visited networks. Instead, interconnect networks are used to forward signaling between the home network and other networks. At present, network operators can utilize time and distance related security countermeasures to determine if a mobile subscriber is actually/physically able to travel from one network (or country) to another network (or another country) within a particular transit time. While such security countermeasures are currently being used by network operators, such measures can only be used in scenarios where the mobile subscriber is moving between two different non-home networks (i.e., not leaving the mobile subscriber's home network to a non-home network) without intercepting the home network core signaling. A DEA is typically capable of determining a transit time of a mobile subscriber by using timestamps corresponding to two update location request messages received from the MME positioned in the respective two visited non-home networks. Notably, the DEA is unable to apply time and/or distance security countermeasures when a subscriber initially moves from a home network to a visited network since the DEA has no knowledge or record of a timestamp associated with a last update location that is initiated in the home network. More specifically, a Diameter authentication information request (AIR) message or update location request (ULR) message that originates in a home network and is directed to a home subscriber server (HSS) in the home network is never received by a DEA.

Accordingly, there exists a need for methods, systems, and computer readable media for conducting a time distance security countermeasure for outbound roaming subscribers using a DEA.

SUMMARY

The subject matter described herein includes a methods, systems, and computer readable media for conducting a time distance security countermeasure for outbound roaming subscribers using a Diameter edge agent (DEA). One method includes receiving, by a DEA, an ingress Diameter message related to a mobile subscriber from a mobility management entity (MME) located in a non-home network, wherein the ingress Diameter message is an authentication information request (AIR) message or a Diameter update location request (ULR) message and sending a routing information request (RIR) message containing a mobile subscriber identifier associated with the mobile subscriber to a home subscriber server (HSS) in a home network of the mobile subscriber. The method further includes receiving identification information identifying a mobility management entity (MME) in the home network that conducted a most recent attachment of the mobile subscriber in the home network and utilizing the identification information to send an insert subscriber data request (IDR) message containing the mobile subscriber identifier to the identified MME. The method also includes receiving, from the MME, an insert subscriber data acknowledgement (IDA) message containing user equipment (UE) attachment timestamp data corresponding to the most recent attachment of the mobile subscriber in the home network, determining a transit time using the UE attachment timestamp data and timestamp information corresponding to the ingress Diameter message, and analyzing the transit time to determine if the ingress Diameter message is to be designated as a suspicious ingress message.

In one example, the transit time is determined to be equal to a calculated time difference existing between the timestamp information corresponding to the ingress Diameter message and the UE attachment timestamp data corresponding to the most recent attachment.

In one example, analyzing the transit time includes comparing the time difference to a predefined minimum transit value stored in a transit time database hosted by the DEA and determining that the predefined minimum transit value exceeds the transit time.

In one example, the method further includes rejecting, by the DEA, the ingress Diameter message in response to determining that the minimum transit time value is determined to be greater than the transit time.

In one example, the method also includes sending, by the DEA, an alert message to a network operator in response to determining that the minimum transit time value is determined to be greater than the transit time. In one example, the method includes extracting a mobile country code (MCC) identifier from an international mobile subscriber identity (IMSI) included in the ingress Diameter message to identify a country associated with the non-home network.

In one example, the DEA comprises a Diameter routing agent (DRA) for functioning at an edge of the home network for the mobile subscriber.

A system for conducting a time distance security countermeasure for outbound roaming subscribers using a Diameter edge agent includes a DEA having at least one processor. The system further includes a transit time database local to the DEA for storing minimum transit times related to a pair of countries and a security engine local to the DEA and implemented using the at least one processor for receiving an ingress Diameter message related to a mobile subscriber from a mobility management entity (MME) located in a non-home network, wherein the ingress Diameter message is an authentication information request (AIR) message or a Diameter update location request (ULR) message. The security engine is further configured for sending a routing information request (RIR) message containing a mobile subscriber identifier associated with the mobile subscriber to a home subscriber server (HSS) in a home network of the mobile subscriber, receiving identification information identifying a mobility management entity (MME) in the home network that conducted a most recent attachment of the mobile subscriber in the home network, and utilizing the identification information to send an insert subscriber data request (IDR) message containing the mobile subscriber identifier to the identified MME. The security engine is further configured for receiving, from the MME, an insert subscriber data acknowledgement (IDA) message containing user equipment (UE) attachment timestamp data corresponding to the most recent attachment of the mobile subscriber in the home network, determining a transit time using the UE attachment timestamp data and timestamp information corresponding to the ingress Diameter message, and analyzing the transit time to determine if the ingress Diameter message is to be designated as a suspicious ingress message.

In one example of the system, the transit time is determined to be equal to a calculated time difference existing between the timestamp information corresponding to the ingress Diameter message and the UE attachment timestamp data corresponding to the most recent attachment.

In one example of the system, the security engine is further configured for comparing the time difference to a predefined minimum transit value stored in the transit time database and for determining that the predefined minimum transit value exceeds the transit time.

In one example of the system, the security engine is further configured for rejecting the ingress Diameter message in response to determining that the minimum transit time value is determined to be greater than the transit time.

In one example of the system, the security engine the security engine is further configured for sending an alert message to a network operator in response to determining that the minimum transit time value is determined to be greater than the transit time.

In one example of the system, the security engine is further configured for extracting a mobile country code (MCC) identifier from an international mobile subscriber identity (IMSI) included in the ingress Diameter message to identify a country associated with the non-home network.

In one example of the system, the DEA comprises a Diameter routing agent (DRA) for functioning at an edge of the home network for the mobile subscriber.

The following terminology is used to describe the subject matter described herein for conducting a time distance security countermeasure for outbound roaming subscribers using a DEA:

Outbound roaming subscribers: Home network subscribers roaming in a non-home network (e.g., a visited or foreign network).

Inbound roaming subscribers: Non-home network mobile subscribers roaming into the MNO's home network.

Home network: a network where operated by a mobile network operator with which a mobile subscriber has a subscriber subscription agreement.

Visited network: a foreign network in which a visiting mobile subscriber is roaming.

Diameter edge agent (DEA): A DEA is an Diameter network node that is deployed at the perimeter or edge of a mobile network operator's (MNO) signaling core network. The DEA connects the MNO's home network elements to other interconnect elements (i.e., connecting home network elements to other MNO network elements or to an IPX provider's nodes that support mobile subscriber roaming). Other functionalities of the DEA include security screening of roaming traffic, topology hiding, and congestion control for protecting a home network from excessive roaming traffic loads.

Update location request (ULR): Diameter message used to update the location of a subscriber in an HSS.

Authentication information request (AIR): Diameter message used to authenticate the subscriber using HSS information.

International mobile subscriber identity (IMSI): unique identity of a subscriber.

Timestamp information: Any data that records the date and time of an event (e.g., an attachment event or the receiving of a particular ingress signaling message).

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Methods, systems, and computer readable media for conducting a time distance security countermeasure for outbound roaming subscribers using a DEA are disclosed. In particular, the disclosed subject matter presents a method and system that implements a time distance check security countermeasure implemented at the DEA when the mobile subscriber roams outside of the home network for the first time and into a visited non-home network. Notably, the disclosed system and method implements the time distance check security countermeasure at the DEA without intercepting any of the core network Diameter signaling traffic in an attempt to learn a mobile subscriber's last attachment occurring in the home network.

As described herein, a time distance check includes a diameter security countermeasure that is used to mitigate the occurrence of fraudulent attacks when a use your equipment belonging to a mobile subscriber roams from a first country (or network) to a second country (or network). As mentioned above, a time distance check is a security countermeasure which detects if a mobile subscriber is physically capable of moving or roaming from a first country (including the mobile subscriber's home network) to a second country within an established transit time (La, a predefined amount of travel time that has been established as likely or possible). In particular, the security countermeasure is applicable to an outbound roaming mobile subscriber leaving a home network and is configured to compare the current location with a previous location of the mobile subscriber and determines if it is physically possible for a mobile subscriber to move from the previous location to the current location in that amount of time. In some embodiments, the determination can be achieved by maintaining a database that records a predefined minimum transit time between each of the VPLMN identifiers or the MCC's corresponding to the VPLMN identifiers. In particular, if a mobile subscriber moves from a first country to a second country and the time difference between the last update location procedure and the current update location procedure (e.g., time difference between last attachment time in the home network and a current AIR/ULR message received in a visited/foreign network) does not exceed the predefined minimum transit time, then the DEA will detect and mark the current ingress AIR/ULR message from the visited network as being potentially suspicious.

Figure 1:
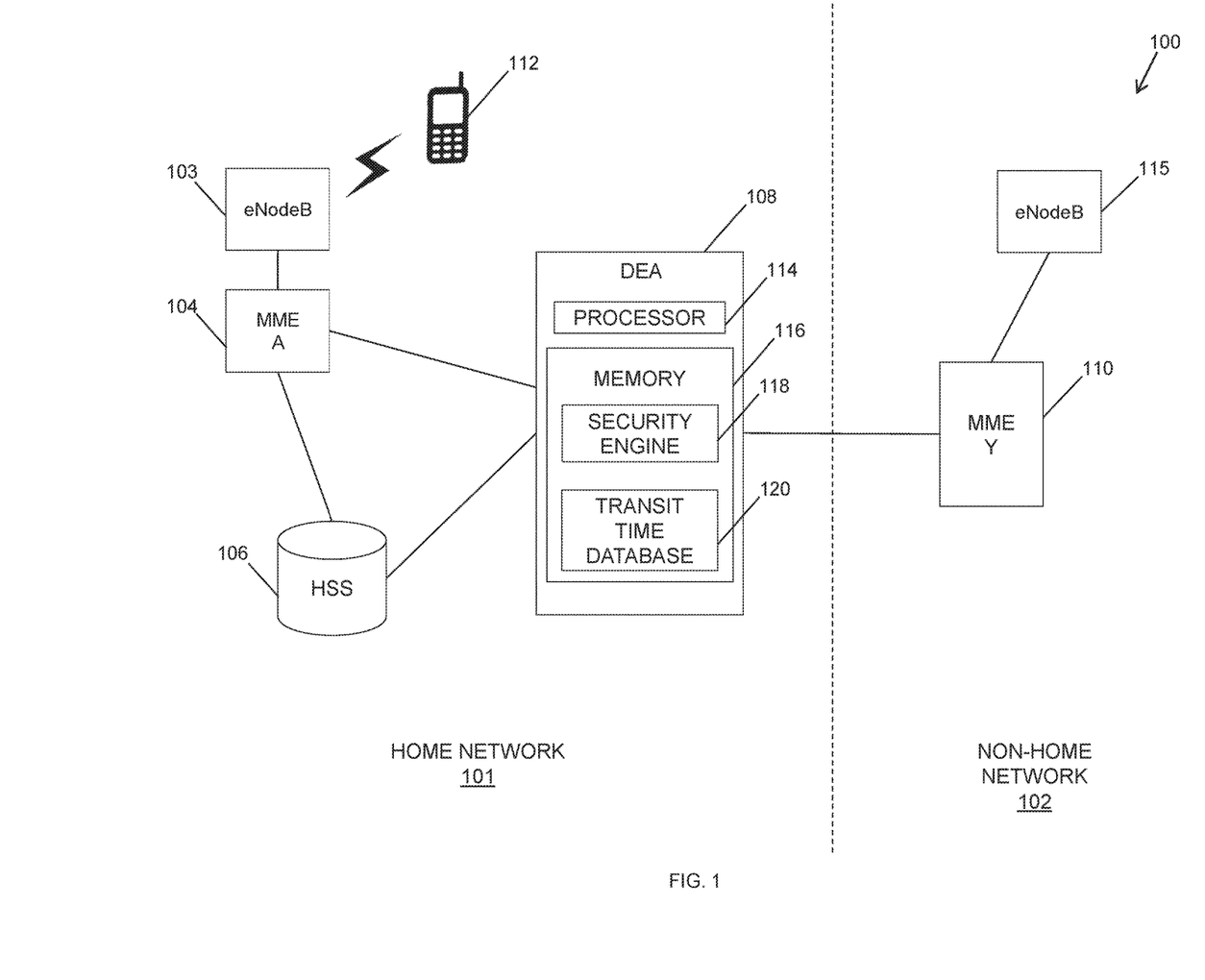
FIG. 1 is a block diagram illustrating an exemplary network for conducting a time distance security countermeasure for outbound roaming subscribers using a DEA according to an embodiment of the subject matter described herein.

FIG. 1 is a block diagram illustrating an exemplary communications network 100 that is configured to facilitate the communication of Diameter signaling messages among its network nodes. As shown in FIG. 1, communications network 100 comprises a home network 101 and a non-home network 102 (e.g., a "visited network" or "foreign network"). For example, home network 101 includes a user equipment (UE) 112, an eNodeB 103, a MME A 104, a HSS 106, and a DEA 108.

In some embodiments, user equipment 112 may include any device that is utilized directly by a mobile subscriber end-user to receive or transmit data, such as a hand-held smart phone, a GSM mobile station, a laptop computer equipped with a mobile broadband adapter, or any other like device. In some embodiments, user equipment 112 is roaming in home network 101 and is communicatively connected (e.g. attached) to MME A 104 via an eNodeB 103. For example, user equipment 112 can utilize a radio interface to establish a wireless connection with eNodeB 103, which in turn is connected to MME A 104.

In some embodiments, MME A 104 serves as a control-node for a long-term evolution (LTE) access-network (e.g., home network 101). MME A 104 serves to monitor and manage the bearer activation/deactivation process and is responsible for selecting the signaling gateway (SGW) (not shown) that services user equipment 112 at the initial attachment and during intra-LTE handovers. MME A 104 is also responsible for authenticating the mobile subscriber associated with user equipment 112 (e.g., by interacting with the HSS). Specifically, MME A 104 is communicatively coupled to HSS 106, which comprises a master subscription database for the home network 101 of the subscriber user. HSS 106 notably maintains records of user equipment devices that are registered to home network 101. In some embodiments, HSS 106 serves as the main subscriber database used within a IP Multimedia Subsystem (IMS) network and is configured to provide mobile subscriber details to other entities within the communications network 100. The use of HSS 106 allows a network to grant or refuse user access to different services dependent on the mobile subscriber's status.

In some embodiments, both MME A 104 and HSS 106 are communicatively connected to DEA 108. DEA 108 may include a router device or element (e.g., a Diameter routing agent) that is configured to relay Diameter messages that enter or depart from home network 101. Notably, DEA 108 is configured to receive Diameter Authentication Information Request (AIR) and Update Location Request (ULR) messages. Likewise, DEA 108 is further configured to send Diameter Authentication Information Answer (AIA) and Update Location Answer (ULA) messages in response to the received AIR and ULR messages.

FIG. 1 further depicts a non-home network 102 which includes an MME Y 110 and eNodeB 115. MME Y 110 is similar in form and structure as MME A 104 (with the exception of serving the non-home network 102 instead of home network 101). Likewise, eNodeB 115 is similar in form and function as eNodeB 103 and is configured to establish a wireless connection with UEs roaming into non-home network 102.

As used herein, the term "update location request message" refers to a Diameter based signaling message for updating a location of a mobile subscriber in a telecommunications network. An "update location request message" is intended to include Diameter ULR messages or any other message for updating the location of a telecommunications network subscriber with the network. In some embodiments, the ULR message is a S6a/d interface message that is used between the MME (and/or a Serving GPRS Support Node (SGSN)) and the HSS for the purposes of updating the location of the mobile subscriber's user equipment 112 within home network 101. MME Y 110 can similarly direct ULR messages to DEA 108 in response to user equipment 112 roaming in non-home network 102.

Likewise, an AIR message is intended to include Diameter authentication information request information messages or any other message for authentication a mobile subscriber. In some embodiments, the AIR message is a S6a/d interface message that is used between the MME (and/or SGSN) and DEA 108 for the purposes of authenticating the mobile subscriber's user equipment 112 upon it being activated in or entering non-home network 102.

Notably, each of the ULR message and AIR message includes an identifier, such as an IMSI, MSISDN, and/or IMEI, that identifies user equipment 112. The ULR message and the AIR message may also include a visited public and mobile network (VPLMN) identifier, which identifies the mobile network operator (MNO) of the message sender. Further, a mobile country code (MCC) identifier, which identifies the country associated with the message sender, can be extracted from the VLPMN identifier included in the ULR or AIR message by the DEA 108. In some embodiments, the ULR message and AIR message can also include a mobile network code (MNC) identifier.

As shown in FIG. 1, DEA 108 may include one or more processors 114, such as a central processing unit (e.g., a single core or multiple processing cores), a microprocessor, a microcontroller, a network processor, an application-specific integrated circuit (ASIC), or the like. DEA 108 may also include memory 116. Memory 116 may comprise random access memory (RAM), flash memory, a magnetic disk storage drive, and the like. In some embodiments, memory 116 may be configured to store a security engine 118 and a transit time database 120. Notably, security engine 118 in memory 116 can perform various monitoring, management, and/or remediation functionalities for DEA 108 when executed by one or more processors 114.

In some embodiments, security engine 118 can include a software component that is responsible for executing applying a time distance check security countermeasure operation to ULR messages and/or AIR messages received by DEA 108. As described in greater detail below, DEA 108 can receive an ingress Diameter message (i.e., ULR message or AIR message) from MME Y 110 in response to user equipment 112 entering or being activated in non-home network 102. For the purposes of this example, it is understood that user equipment 112 was attached to home network 101 at some time prior to entering non-home network 102. In some embodiments, MME Y 110 communicates the AIR or ULR message to DEA 108 via a Diameter S6a/d interface. In response to receiving the ULR or AIR message, DEA 108 initiates security engine 118, which is configured to record a timestamp for the received ULR/AIR message. In particular, the timestamp serves as a time record which documents the time and other metadata related to the Diameter ULR or AIR message received by DEA 108 from MME Y 110 in the non-home network.

In addition to recording the timestamp information, security engine 118 is configured to identify the IMSI included in the received ingress Diameter message. Notably, the IMSI may include the MCC-MNC of the home network to which the user equipment belongs. Furthermore, security engine 118 can be configured to subsequently extract one or more of the MNC identifier and/or VPLMN identifier from the IMSI (e.g., contained in AIR and ULR messages). In particular, security engine 118 can examine the MCC of the IMSI in order to identify that the UE belongs to the home network. In addition, security engine 118 may be configured to extract the MCC identifier from the VPLMN identifier in order to identify the MCC of the non-home network (e.g., visited network). Once the identifier is extracted from the ingress Diameter message, security engine 118 records the identification data and the timestamp information in local storage or in buffer memory. Moreover, security engine 118 can detect when user equipment 112 roams from home network 101 to non-home network 102. For example, security engine 118 may determine that there are no stored/recorded timestamp related records corresponding to user equipment 112 and its home network 101. In such instances, security engine 118 is configured to generate and send a RIR message to HSS 106. Notably, security engine 118 can determine the identity of HSS 106 by obtaining the mobile subscriber's home network identifier from the IMSI in the ingress Diameter message. Notably, the home network identifier in the IMSI can be cross-referenced to a local database that maps network identifiers to HSS addresses. In some embodiments, the RIR message directed to HSS 106 contains the IMSI and/or some other identifier associated with the mobile subscriber or user equipment 112. In response to receiving the RIR message, HSS 106 locates identification information corresponding to the MME in home network 101 that is responsible for establishing the last attachment for user equipment 112 (e.g., attachment triggered by MME A 104 sending an ULR message to HSS 106 in response to user equipment 112 sending an attachment request within home network 101).

HSS 106 subsequently directs a RIA message containing the identification information of MME A 104 to DEA 108, which responds by generating and sending an IDR message (e.g., a S6a/d Diameter IDR message) containing the mobile subscriber's identification information (e.g., IMSI) to the identified MME, i.e., MME A 104.

In response to the IDR message, MME A 104 accesses a local timestamp record database (not shown) to locate the last update location request timestamp data (or last attachment time) corresponding to the mobile subscriber and/or user equipment 112. MME A 104 then sends a Diameter IDA message containing the last update location request timestamp data back to DEA 108 and/or security engine 118. After receiving this timestamp information, security engine 118 is configured to calculate a transit time experienced by user equipment 112 traveling from home network 101 to non-home network 102. For example, security engine 118 can determine the transit time by calculating the time difference between the last timestamp of the last attachment (e.g., last update location request timestamp) in the home network 101 and the AIR time when the or ULR message is received by DEA 108 from MME Y 110. Once the transit time is calculated, security engine 118 can access transit time database 120 to locate a minimum transit time value corresponding to home network 101 and non-home network 102. An example of transit time database 120 is described below and depicted in FIG. 4. If security engine 118 determines that the transit time is less than the minimum transit time value that is predefined in transit time database 120, security engine 118 can designate or tag the Diameter message received from 110 as being potentially suspicious. In some embodiments, transit time database 120 may reside locally in DEA 108 as shown in FIG. 1. Alternatively, transit time database 120 may be contained in a database host that can be accessed by, but is separate and distinct from, DEA 108.

Figure 2:
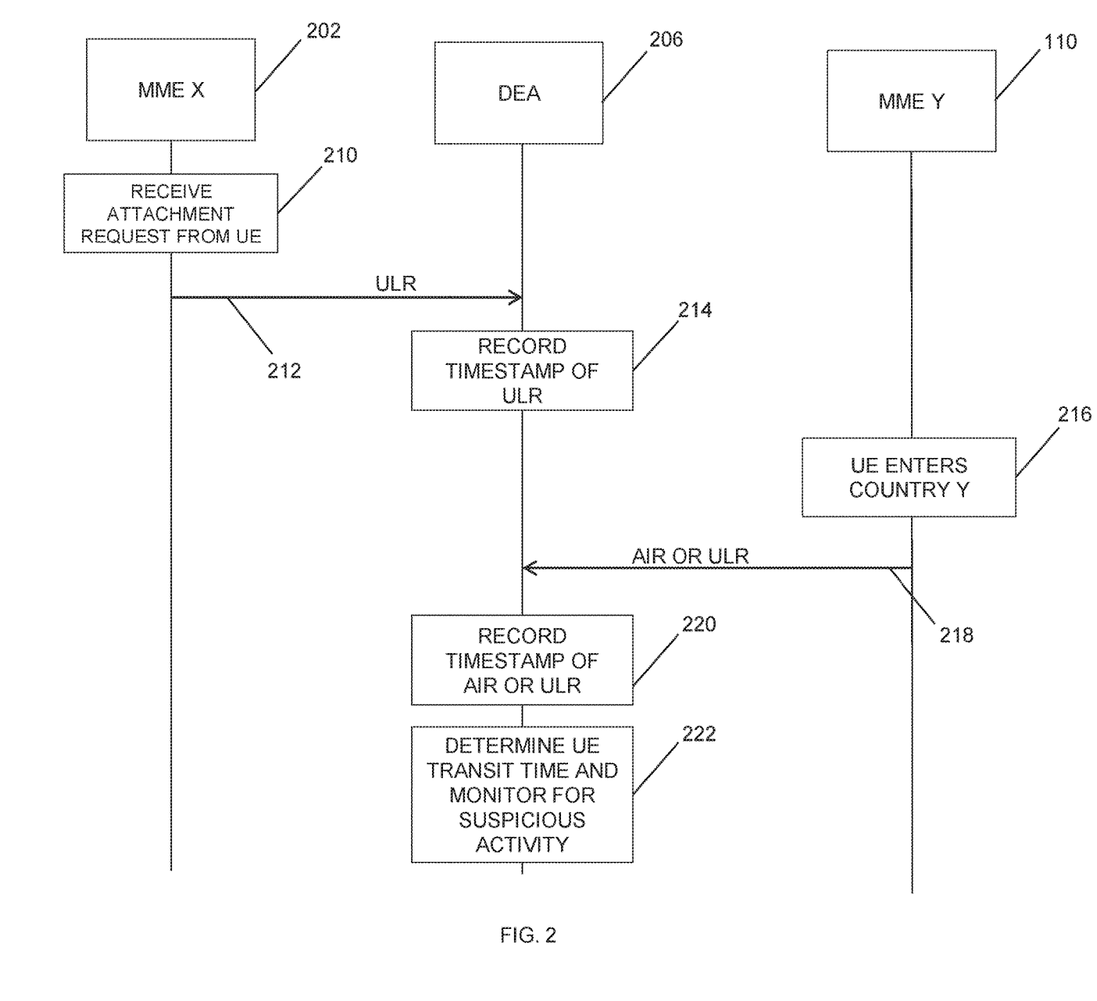
FIG. 2 is a signaling diagram illustrating the communication of messages for conducting a time distance security countermeasure for mobile subscribers roaming between non-home networks using a DEA.

FIG. 2 is a signaling diagram illustrating the communication of messages for conducting a time distance security countermeasure for mobile subscribers roaming between non-home networks using a DEA. Referring to block 210 of FIG. 2, a user equipment enters or is activated in a country "X" (or a network "X"). In response, the user equipment sends an attachment request message to MME X 202 via an eNodeB (see block 210). After receiving the attachment request, visited MME X 202 generates and sends a ULR message 212 to DEA 206. After receiving the ULR message 212, DEA 206 records a timestamp of the received ULR message 212 (see block 214).

At some point in time after receiving ULR message 212, the user equipment enters a second country (e.g., country "Y") as represented in block 216. At this time, the user equipment likewise sends an attachment request message to visited MME Y 110 via eNodeB (not shown). In response to receiving the attachment request, visited MME Y 110 sends a Diameter request message 218 (e.g., an AIR message or an ULR message) to DEA 206. After receiving the AIR message or the ULR message, DEA 206 records the timestamp of the received Diameter request message 218 (see block 220). In block 222, DEA 206 further determines a transit time utilizing the previously recorded timestamp information associated with the user equipment (e.g., as recorded in block 214 and block 220). DEA 206 can also utilize this transit time information to determine if the received AIR or ULR message is associated with suspicious activity. Notably, FIG. 2 illustrates a scenario where DEA 206 receives ULR messages or AIR messages from an MME in a visited network. More specifically, it should be noted that the user equipment is not traveling or roaming to or from the mobile subscriber's home network in this example.

Figure 3A:
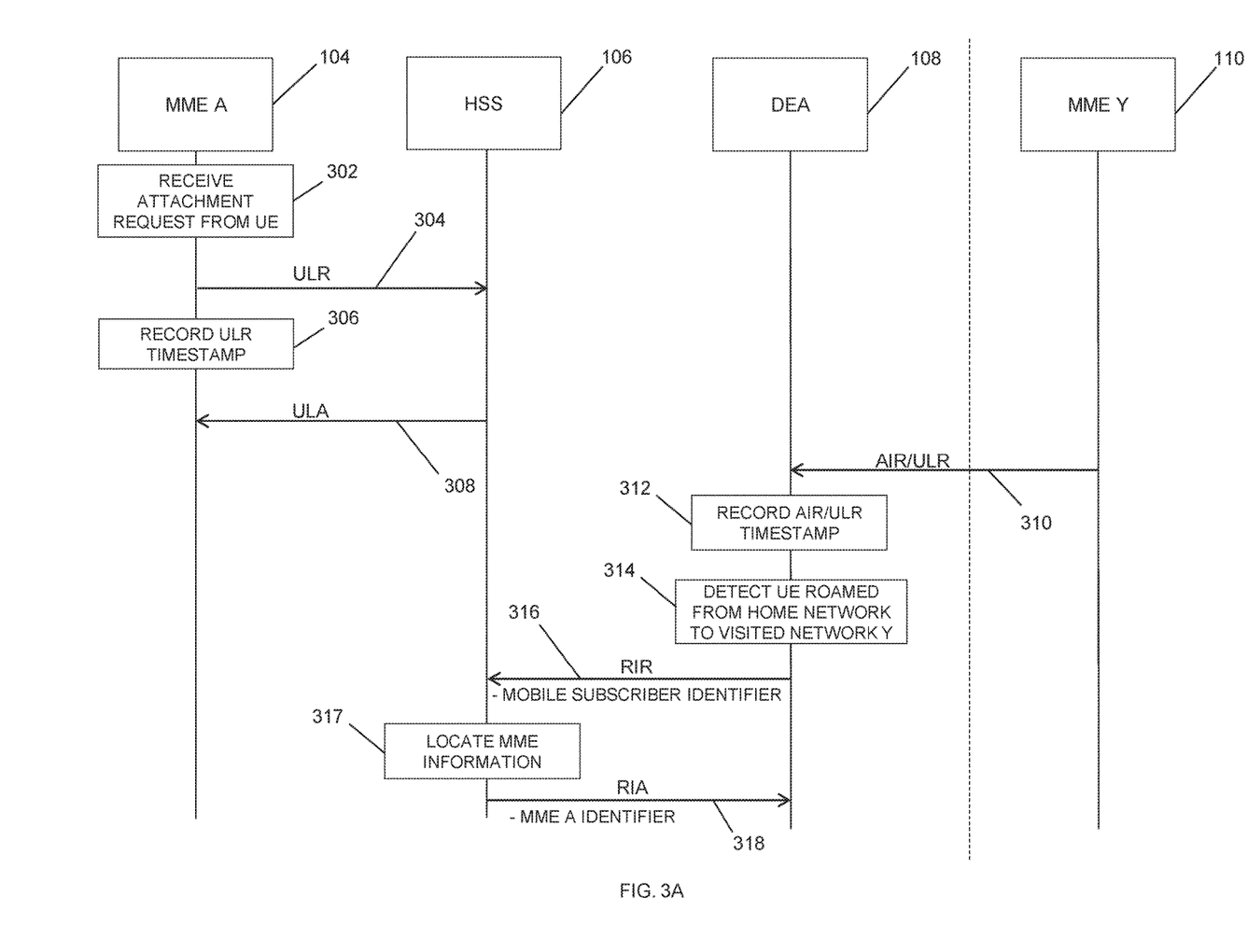
FIGS. 3A and 3B depict a signaling diagram illustrating the communication of messages for conducting a time distance security countermeasure for outbound mobile subscribers roaming from a home network to a non-home network using a DEA according to an embodiment of the subject matter described herein.
Figure 3B:
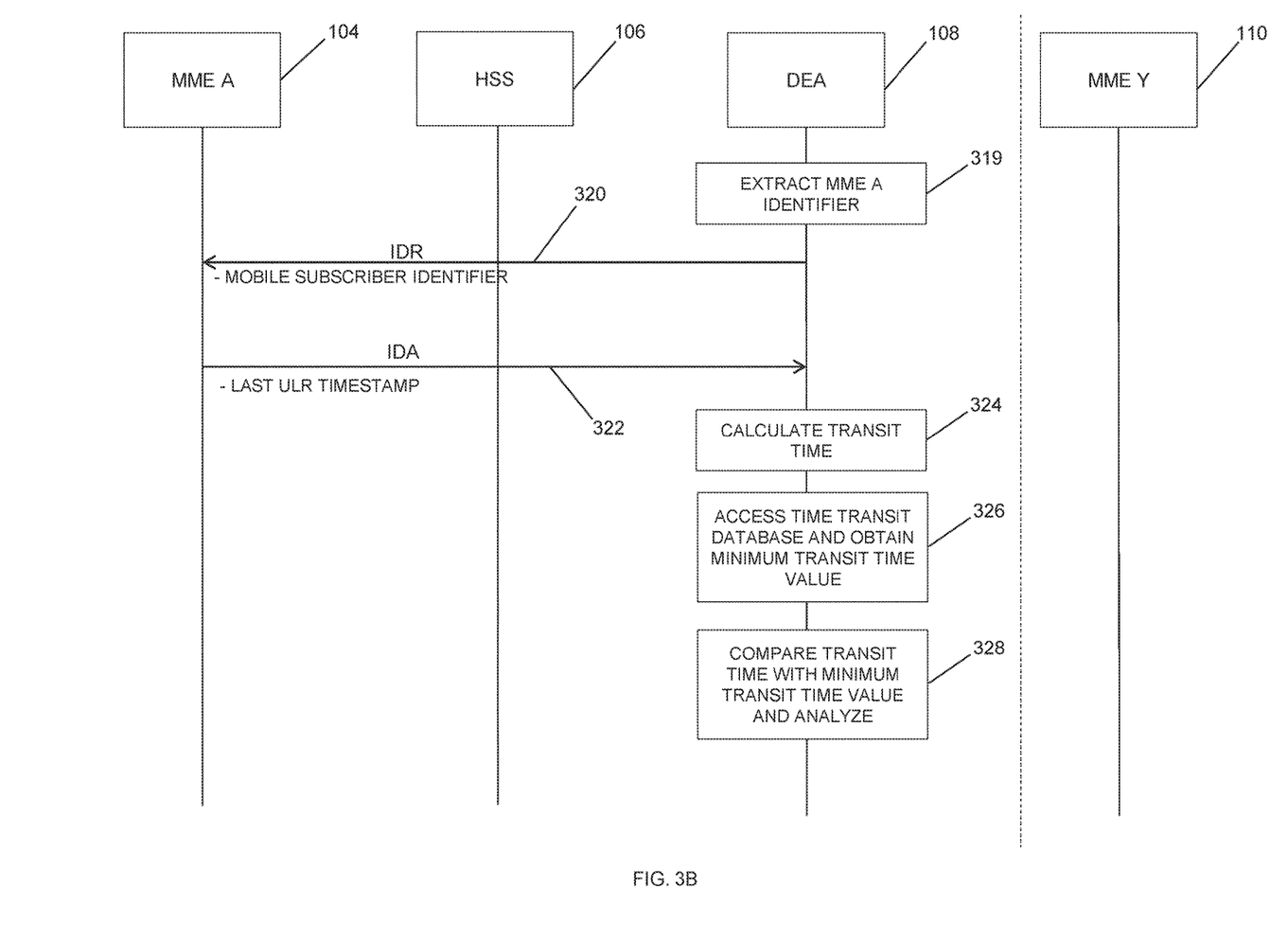

FIGS. 3A and 3B depict a signaling diagram illustrating the communication of messages for conducting a time distance security countermeasure for outbound mobile subscribers roaming from a home network to a non-home network using a DEA according to an embodiment of the subject matter described herein. Referring to FIG. 3A, a user equipment may enter or be activated in the associated mobile subscriber's home network. In response, the user equipment sends an attachment request message to home network MME A 104 via an eNodeB (see block 302). After receiving the attachment request message, home network MME A 104 generates and sends a ULR message 304 to HSS 106 in the home network. Notably, DEA 108 does not receive any Diameter messages from MME A 104 or HSS 106 at this stage. After sending the ULR message 304 to HSS 106, MME A 104 records a timestamp of when ULR message 304 was sent and/or the attachment of the UE (see block 306). Similarly, HSS 106 generates a record indicating MME 104 as being the MME serving the attached user equipment (i.e., stores the MME identification and/or address information which is mapped to a user equipment identifier). HSS 106 subsequently sends ULA message 308 in response to ULR message 304.

At some later point in time after the attachment of the user equipment in the home network, the user equipment enters a second country (e.g., country Y). For example, the mobile subscriber roams into visited network associated with country Y that is located apart from the mobile subscriber's home network (e.g., in country "X"). In a similar manner described above, the user equipment sends an attachment request message to visited MME Y 110 via eNodeB (not shown). In response to receiving the attachment request message, visited MME Y 110 (which may also be embodied as an MME/SGSN) generates an AIR and/or ULR message as part of the authentication and update location procedure. Further, visited MME Y 110 then sends the generated Diameter ingress message (e.g., AIR message or an ULR message) 310 to DEA 108. After receiving the AIR message or the ULR message, DEA 108 records the timestamp of the received ingress Diameter message 310 (see block 312) for later timestamp comparison.

In block 314, DEA 108 detects that the user equipment has roamed from the home network to the visited network "Y". DEA 108 notably does not have any information relating to the user equipment's last attachment in the home network (or when the last update location request was sent to the HSS) since DEA 108 does not receive any ULR messages or related signaling messages from the home network elements. Consequently, DEA 108 is configured to initiate and send a RIR message 316 to HSS 106. In some embodiments, DEA 108 obtains address or identification information pertaining to HSS 106 by extracting the data from the received ingress Diameter message 310 (e.g., AIR or ULR message). After receiving RIR message 316, HSS 106 utilizes mobile subscriber identification (e.g., IMSI) information included in RIR message 316 to locate the stored identification information or address information associated with serving MME 104 (see block 317). HSS 106 may then provide the identification or address information pertaining to MME A 104 (e.g., an MME/SGSN identity) to DEA 108 via an RIA message 318. In such a scenario, DEA 108 is functioning as a gateway mobile location center (GLMC) node in its communications with HSS 106.

Referring to FIG. 3B, DEA 108 can extract the MME identification information (see block 319) and send an identification data request (IDR) message 320 to the identified MME (i.e., MME A 104) in response to receiving RIA message 318. Notably, IDR message 320 may include a mobile subscriber identifier (e.g., IMSI). In some embodiments, IDR message 320 is a s6a/d interface IDR message that serves as a request to retrieve the last update location timestamp. Upon receiving the IDR message 320, MME A 104 responds with an IDA message 322. The IDA message 322 includes the last update location request timestamp (or alternatively, last attached time in the home network) corresponding to the identified mobile subscriber and/or user equipment. In some embodiments, DEA 108 and/or the security engine request location information (which also includes the last home network attachment timestamp) from the home network MME A 104 by setting a 'EPS Location Information Request' IDR flag bit in IDR message 320. MME A 104 will include the last update location timestamp using an "Age-of-Location-Information" attribute-value pair (AVP) that is embedded into the "MME-Location-Information/SGSN-Location Information AVP of the IDA message 322.

In block 324, DEA 108 (and/or its security engine) is configured to extract and record the last update location request time (and/or last attachment time) included in IDA message 322. For example, DEA 108 and/or its security engine may be configured to store the home network last update location timestamp information in a local database for future analysis. For example, in block 324, DEA 108 can calculate a transit time corresponding to the user equipment by taking the time difference between the last update location request time (and/or last attached time in the home network) indicated in message 322 and the timestamp information recorded from the previously received AIR or ULR message (see block 312). DEA 108 can also utilize this transit time to determine if the received Diameter ingress message (e.g., AIR or ULR message) 310 is associated with suspicious activity. In some embodiments, DEA 108 will compare the transit time calculated in block 324 with a minimum transit time recorded in a minimum transit time table. If the minimum transit time is not exceeded by the transit time calculated in block 324, then DEA 108 is configured to designate the received Diameter ingress message 310 as suspicious. In response, DEA 108 can be configured to drop or reject message 310. Further, DEA 108 may also be configured to send an alert message to a network operator or some other security measure network element.

Figure 4:
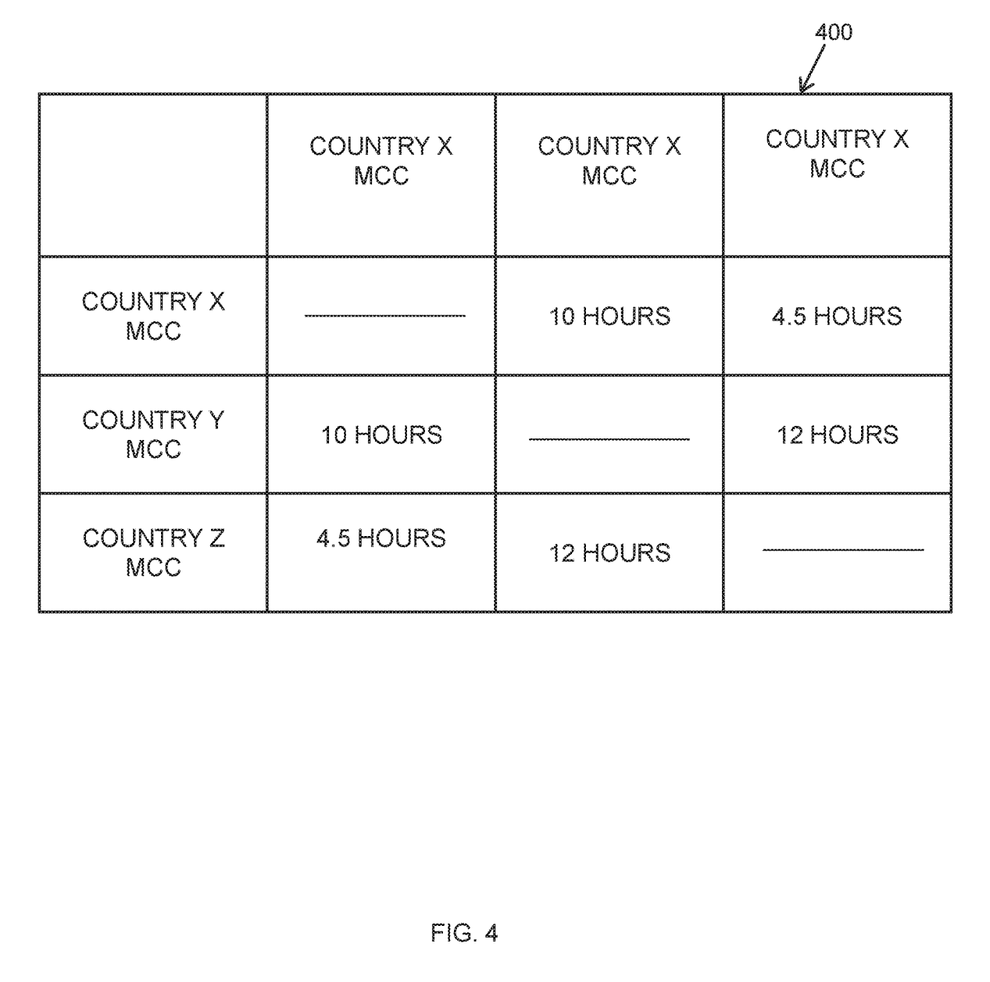
FIG. 4 is a block diagram of a time transit database table utilized for conducting a time distance security countermeasure for outbound roaming subscribers using a DEA according to an embodiment of the subject matter described herein.

FIG. 4 depicts exemplary transit time database table 400 (not unlike transit time database 120 depicted in FIG. 1) that can be utilized and referenced by security engine 118. Database table 400 as shown in FIG. 4 is depicted as including a plurality of entries containing minimum transit times associated with three countries. Although only three countries are shown in database table 400, additional countries may be represented without departing from the scope of the disclosed subject matter. As illustrated in FIG. 4, each of the entries of database table 400 indicates a predefined minimum transit time between two of country X, country Y, and country Z. For example, database table 400 indicates that the minimum transit time between country X and country Y is defined as 10 hours. Likewise, the minimum transit time between country X and country Z is defined as 4.5 hours and the minimum transit time between country Y and country Z is defined as 12 hours. In some embodiments, security engine 118 is configured to access database table 400 by using two country identifiers (e.g., MCC identifiers) to determine the relevant minimum transit time between the two countries for its time distance security countermeasure analysis as described herein. Although database table 400 is populated with MCC identifiers that represent different countries, database table 400 can be configured to alternatively utilize MNO identifiers (e.g., VPLMN identifiers) without departing from the scope of the disclosed subject matter.

Figure 5:
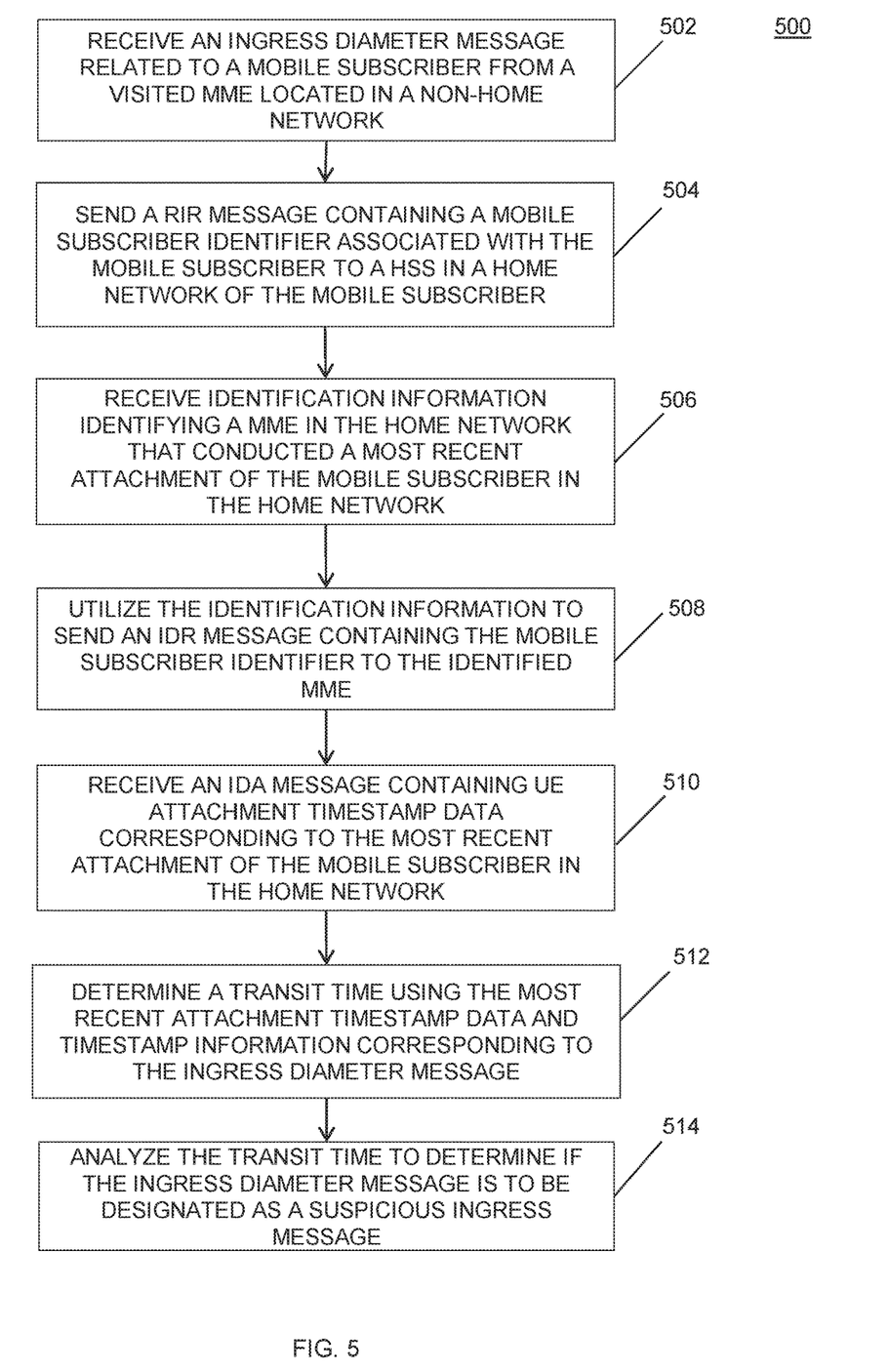
FIG. 5 is a flow chart illustrating an exemplary process conducting a time distance security countermeasure for outbound roaming subscribers using a DEA according to an embodiment of the subject matter described herein.

FIG. 5 is a flow chart illustrating an exemplary process or method 500 for conducting a time distance security countermeasure for outbound roaming subscribers using a DEA according to an embodiment of the subject matter described herein. In some embodiments, method 500 depicted in FIG. 5 is an algorithm stored in memory that when executed by a hardware processor performs steps 502-514. In block 502, an ingress Diameter message related to a mobile subscriber is received from an MME located in a non-home network. In some embodiments, the ingress Diameter message received from the MME is an AIR message or an ULR message.

In block 504, a RIR message containing a mobile subscriber identifier associated with the mobile subscriber is sent to an HSS located in a home network of the mobile subscriber. In some embodiments, the DEA accesses an internal database to determine the HSS serving the mobile subscriber. The DEA may determine the address for identity of the HSS by extracting a mobile subscriber identifier, such as the IMSI, from the ingress diameter message received from the non-home network MME. The DEA can then generate the RIR message, such as a Diameter SLh interface RIR message containing the mobile subscriber identifier. The DEA can also utilize the mobile subscriber identifier to determine the identity or address of the HSS. With this address information, the DEA can direct the RIR message to the HSS in the home network of the mobile subscriber.

In block 506, identification information identifying a MME that conducted a most recent attachment of the mobile subscriber in the home network is received. For example, the HSS that received the RIR message from the DEA response with an acknowledgement message containing the identity of the MME that is responsible for performing the last attachment of the mobile subscriber's UE, In some embodiments, the answer message received by the DEA is a Diameter SLh interface request information acknowledgement (RIA) message.

In block 508, the identification information identifying the MME is utilized to send an IDR message containing the mobile subscriber identifier to the identified MME. For example; the security engine may reference a local database that maps MME identities with corresponding network addresses. As such, the DEA can obtain the network address of the identified MME using the MME identifier obtained in block 506. In some embodiments, the security engine in the DEA is further configured to insert the IMSI of the mobile subscriber in an IDR message that is directed to the identified MME.

In block 510, an IDA message containing the attachment timestamp data is received by the DEA from the MME in the home network. Specifically, the attachment timestamp data serves as a record of the last or the most recent attachment of the mobile subscriber in the home network.

In block 512, a transit time is determined using the UE attachment timestamp data and time-stamped information corresponding to the ingress Diameter message. For example, the security engine in the DEA is configured to calculate a transit time that includes the time difference between the most recent attachment timestamp data provided by the home network MME and timestamp information generated by the DEA at the time the ingress diameter message was received from the visited network MME.

In block 514, the transit time is analyzed to determine if the ingress Diameter message is to be designated as a suspicious ingress message. In some embodiments, the security engine in the DEA is configured to compare the transit time with entries in a local minimum transit time database. In particular, the minimum transit time database includes entries that specified a minimum transit time that exists between a pair of countries, or alternatively a pair of networks. In the event the security engine determined that the transit time is less than the minimum transit time indicated in the transit time database, then the security engine will tag or designate the ingress diameter message received from the visited enemy as a suspicious ingress message. If the ingress Diameter message is designated as a suspicious ingress message, the security engine in the DEA can reject the Diameter ingress message, thereby preventing potential fraudulent activities. Further, the security engine can also issue an alert signal or message to a network operator in the event the ingress Diameter message is designated as a suspicious ingress message.

Advantages of the subject matter described herein include the ability to be deployed and operational at a Diameter signaling router (DSR) or Diameter routing agent deployed as a network operator's Diameter edge agent. Deploying the time distance check security countermeasure method at the DEA enables a DEA to implement the described time distance check security countermeasure in a manner that obviates the need for the DEA to intercept home network core signaling. As such, a DEA configured to execute a time distance check security countermeasure in such a manner is able to identify suspicious messaging and/or prevent fraudulent attacks without having the need to continuously request and receive attachment information from a multitude of MMEs servicing a multitude of mobile subscribers. Notably, the amount of signaling communicated in the network and the requisite storage space hosted by the DEA is significantly reduced. As such, a DEA configured to perform the time distance check security countermeasure as described herein improves the technological field of computer network security by reducing the likelihood of fraud and other types of signaling attacks on computer networks in a more efficient manner.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for conducting a time distance security countermeasure for outbound roaming subscribers using a Diameter edge agent (DEA), the method comprising: receiving, by a DEA, an ingress Diameter message related to a mobile subscriber from a mobility management entity (MME) located in a non-home network, wherein the ingress Diameter message is an authentication information request (AIR) message or a Diameter update location request (ULR) message; sending a routing information request (RIR) message containing a mobile subscriber identifier associated with the mobile subscriber to a home subscriber server (HSS) in a home network of the mobile subscriber; receiving identification information identifying a mobility management entity (MME) in the home network that conducted a most recent attachment of the mobile subscriber in the home network; utilizing the identification information to send an insert subscriber data request (IDR) message containing the mobile subscriber identifier to the identified MME; receiving, from the MME, an insert subscriber data acknowledgement (IDA) message containing user equipment (UE) attachment timestamp data corresponding to the most recent attachment of the mobile subscriber in the home network; determining, by the DEA, a transit time of the user equipment using the UE attachment timestamp data and timestamp information corresponding to the ingress Diameter message; and analyzing, by the DEA, the transit time of the user equipment to determine if the ingress Diameter message is to be designated as a suspicious ingress message wherein analyzing the transit time includes comparing the transit time of the user equipment to a predefined minimum transit time between two countries; wherein the transit time is determined to be equal to a calculated time difference existing between the timestamp information corresponding to the ingress Diameter message and the UE attachment timestamp data corresponding to the most recent attachment; and wherein analyzing the transit time includes comparing the calculated time difference to a predefined minimum transit value stored in a transit time database hosted by the DEA and determining that the predefined minimum transit value exceeds the transit time.

2. The method of claim 1 comprising rejecting, by the DEA, the ingress Diameter message in response to determining that the minimum transit time value is determined to be greater than the transit time.

3. The method of claim 1 comprising sending, by the DEA, an alert message to a network operator in response to determining that the minimum transit time value is determined to be greater than the transit time.

4. The method of claim 1 comprising extracting a mobile country code (MCC) identifier from an international mobile subscriber identity (IMSI) included in the ingress Diameter message to identify a country associated with the non-home network.

5. The method of claim 1 wherein the DEA comprises a Diameter routing agent (DRA) for functioning at an edge of the home network for the mobile subscriber.

6. A system for conducting a time distance security countermeasure for outbound roaming subscribers using a Diameter edge agent (DEA), the system comprising: a Diameter edge agent (DEA) including at least one processor; a transit time database local to the DEA for storing minimum transit times related to a pair of countries; and a security engine local to the DEA and implemented using the at least one processor for receiving an ingress Diameter message related to a mobile subscriber from a mobility management entity (MME) located in a non-home network, wherein the ingress Diameter message is an authentication information request (AIR) message or a Diameter update location request (ULR) message, sending a routing information request (RIR) message containing a mobile subscriber identifier associated with the mobile subscriber to a home subscriber server (HSS) in a home network of the mobile subscriber, receiving identification information identifying a mobility management entity (MME) in the home network that conducted a most recent attachment of the mobile subscriber in the home network, utilizing the identification information to send an insert subscriber data request (IDR) message containing the mobile subscriber identifier to the identified MME, receiving, from the MME, an insert subscriber data acknowledgement (IDA) message containing user equipment (UE) attachment timestamp data corresponding to the most recent attachment of the mobile subscriber in the home network, determining a transit time of the user equipment using the UE attachment timestamp data and timestamp information corresponding to the ingress Diameter message, and analyzing the transit time of the user equipment to determine if the ingress Diameter message is to be designated as a suspicious ingress message, wherein analyzing the transit time includes comparing the transit time of the user equipment to a predefined minimum transit time between two countries; wherein the transit time is determined to be equal to a calculated time difference existing between the timestamp information corresponding to the ingress Diameter message and the UE attachment timestamp data corresponding to the most recent attachment; and wherein the security engine is further configured for comparing the calculated time difference to a predefined minimum transit value stored in the transit time database and for determining that the predefined minimum transit value exceeds the transit time.

7. The system of claim 6 wherein the security engine is further configured for rejecting the ingress Diameter message in response to determining that the minimum transit time value is determined to be greater than the transit time.

8. The system of claim 6 wherein the security engine is further configured for sending an alert message to a network operator in response to determining that the minimum transit time value is determined to be greater than the transit time.

9. The system of claim 6 wherein the security engine is further configured for extracting a mobile country code (MCC) identifier from an international mobile subscriber identity (IMSI) included in the ingress Diameter message to identify a country associated with the non-home network.

10. The system of claim 6 wherein the DEA comprises a Diameter routing agent (DRA) for functioning at an edge of the home network for the mobile subscriber.

11. A non-transitory computer readable medium having stored thereon executable instructions that when executed by a processor of a computer controls the computer to perform steps comprising: receiving, by a DEA, an ingress Diameter message related to a mobile subscriber from a mobility management entity (MME) located in a non-home network, wherein the ingress Diameter message is an authentication information request (AIR) message or a Diameter update location request (ULR) message; sending a routing information request (RIR) message containing a mobile subscriber identifier associated with the mobile subscriber to a home subscriber server (HSS) in a home network of the mobile subscriber; receiving identification information identifying a mobility management entity (MME) in the home network that conducted a most recent attachment of the mobile subscriber in the home network; utilizing the identification information to send an insert subscriber data request (IDR) message containing the mobile subscriber identifier to the identified MME; receiving, from the MME, an insert subscriber data acknowledgement (IDA) message containing user equipment (UE) attachment timestamp data corresponding to the most recent attachment of the mobile subscriber in the home network; determining, by the DEA, a transit time of the user equipment using the UE attachment timestamp data and timestamp information corresponding to the ingress Diameter message; and analyzing, by the DEA, the transit time of the user equipment to determine if the ingress Diameter message is to be designated as a suspicious ingress message, wherein analyzing the transit time includes comparing the transit time of the user equipment to a predefined minimum transit time between two countries; wherein the transit time is determined to be equal to a calculated time difference existing between the timestamp information corresponding to the ingress Diameter message and the UE attachment timestamp data corresponding to the most recent attachment; and wherein analyzing the transit time includes comparing the calculated time difference to a predefined minimum transit value stored in a transit time database hosted by the DEA and determining that the predefined minimum transit value exceeds the transit time.

12. The non-transitory computer readable medium of claim 11 comprising rejecting, by the DEA, the ingress Diameter message in response to determining that the minimum transit time value is determined to be greater than the transit time.

13. The non-transitory computer readable medium of claim 11 comprising sending, by the DEA, an alert message to a network operator in response to determining that the minimum transit time value is determined to be greater than the transit time.

14. The non-transitory computer readable medium of claim 11 comprising extracting a mobile country code (MCC) identifier from an international mobile subscriber identity (IMSI) included in the ingress Diameter message to identify a country associated with the non-home network.

* * * * *

UNITED STATES PATENT AND TRADEMARK OFFICE
CERTIFICATE OF CORRECTION

| | | |
|---|---|---|
| PATENT NO. | : 10,834,045 B2 | Page 1 of 2 |
| APPLICATION NO. | : 16/100172 | |
| DATED | : November 10, 2020 | |
| INVENTOR(S) | : Mahalank et al. | |

It is certified that error appears in the above-identified patent and that said Letters Patent is hereby corrected as shown below:

On the Title Page

On page 3, Column 1, under Other Publications, Line 66, delete ""Digitial" and insert -- "Digital --, therefor.

On page 3, Column 2, under Other Publications, Line 18, delete "Monile" and insert -- Mobile --, therefor.

On page 4, Column 1, under Other Publications, Lines 3-4, delete "/US2019.028814." and insert -- /US2019/028814. --, therefor.

On page 4, Column 1, under Other Publications, Line 14, delete "Internatioanl" and insert -- International --, therefor.

On page 4, Column 1, under Other Publications, Line 19, delete "Writting" and insert -- Written --, therefor.

On page 4, Column 1, under Other Publications, Line 19, delete "Authoriyty," and insert -- Authority, --, therefor.

On page 4, Column 1, under Other Publications, Line 20, delete "Applicatio" and insert -- Application --, therefor.

On page 4, Column 1, under Other Publications, Line 27, delete "Aspects;.Unstructured" and insert -- Aspects; Unstructured --, therefor.

On page 4, Column 1, under Other Publications, Line 31, delete "MT-SMs" and insert -- MT-SMS --, therefor.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,834,045 B2

In the Specification

In Column 5, Line 13, delete "(La," and insert -- (i.e., --, therefor.

In Column 8, Line 21, delete "the or" and insert -- the --, therefor.

In Column 11, Line 41, delete "UE," and insert -- UE. --, therefor.

In Column 11, Line 48, delete "example;" and insert -- example, --, therefor.